United States Patent
Hwang et al.

(10) Patent No.: US 9,489,875 B2
(45) Date of Patent: Nov. 8, 2016

(54) PIXEL, STEREOSCOPIC IMAGE DISPLAY DEVICE, AND DRIVING METHOD THEREOF

(71) Applicant: SAMSUNG DISPLAY CO., LTD., Yongin-si, Gyeonggi-do (KR)

(72) Inventors: Young-In Hwang, Yongin (KR); Hae-Yeon Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 292 days.

(21) Appl. No.: 13/765,670

(22) Filed: Feb. 12, 2013

(65) Prior Publication Data

US 2014/0111563 A1 Apr. 24, 2014

(30) Foreign Application Priority Data

Oct. 19, 2012 (KR) .................. 10-2012-0116685

(51) Int. Cl.
*G09G 3/00* (2006.01)
*G09G 3/32* (2016.01)
*H04N 13/04* (2006.01)
*G09G 3/20* (2006.01)

(52) U.S. Cl.
CPC ............ *G09G 3/003* (2013.01); *G09G 3/3233* (2013.01); *H04N 13/0438* (2013.01); *H04N 13/0497* (2013.01); *G09G 3/2022* (2013.01); *G09G 2300/0819* (2013.01); *G09G 2300/0852* (2013.01); *G09G 2300/0861* (2013.01); *G09G 2300/0866* (2013.01); *G09G 2310/0251* (2013.01); *G09G 2310/063* (2013.01); *G09G 2320/0209* (2013.01); *G09G 2320/043* (2013.01)

(58) Field of Classification Search
CPC ........ G09G 3/22; G09G 3/3208; G09G 3/30; G09G 3/3225; G09G 3/3233; G09G 3/3241; G09G 3/3266; G09G 3/3275; G09G 3/3258
See application file for complete search history.

(56) References Cited

U.S. PATENT DOCUMENTS

| 9,305,478 | B2* | 4/2016 | Park ...................... G09G 3/003 |
| 2004/0263440 | A1* | 12/2004 | Kimura et al. .................. 345/76 |
| 2005/0057580 | A1* | 3/2005 | Yamano et al. .............. 345/690 |
| 2007/0035706 | A1* | 2/2007 | Margulis ....................... 353/122 |

(Continued)

FOREIGN PATENT DOCUMENTS

| KR | 10-2005-0005646 A | 1/2005 |
| KR | 10-1073281 B1 | 10/2011 |

(Continued)

*Primary Examiner* — Kent Chang
*Assistant Examiner* — William Lu
(74) *Attorney, Agent, or Firm* — Lewis Roca Rothgerber Christie LLP

(57) ABSTRACT

A stereoscopic image display device includes a display panel including a plurality of pixels, a scan driver, a gate driver, a data driver, and a controller, and a sub-frame includes a first period during which a data voltage according to an image data signal emitted in the previous sub-frame is initialized, a second period during which a data voltage according to the image data signal written in the previous sub-frame is transmitted and a threshold voltage of a driving transistor of each pixel is compensated, a third period during which a data voltage according to a next sub-frame's data signal is sequentially written to the respective pixels, and a fourth period that is concurrent with and equal to or longer than the third period and during which the respective pixels concurrently emit light corresponding to the data voltage according to the image data signal written in the previous sub-frame.

18 Claims, 6 Drawing Sheets

(56) References Cited

U.S. PATENT DOCUMENTS

| | | | |
|---|---|---|---|
| 2007/0085847 A1* | 4/2007 | Shishido | 345/204 |
| 2010/0091207 A1* | 4/2010 | Hasegawa et al. | 349/15 |
| 2010/0259653 A1* | 10/2010 | Kimura | 348/252 |
| 2011/0309236 A1* | 12/2011 | Tian et al. | 250/208.1 |
| 2012/0026163 A1* | 2/2012 | Koyama et al. | 345/419 |
| 2012/0081624 A1* | 4/2012 | Kobayashi | G09G 3/3406 349/15 |
| 2012/0105605 A1* | 5/2012 | Nam | G09G 3/003 348/51 |
| 2013/0027390 A1* | 1/2013 | Kim | H04N 13/0022 345/419 |
| 2013/0120341 A1* | 5/2013 | Kasai et al. | 345/211 |
| 2013/0135275 A1* | 5/2013 | Okuno | G09G 3/3291 345/211 |

FOREIGN PATENT DOCUMENTS

| | | |
|---|---|---|
| KR | 10-2012-0043301 A | 5/2012 |
| KR | 10-2012-0065139 A | 6/2012 |

\* cited by examiner

PIXEL, STEREOSCOPIC IMAGE DISPLAY DEVICE, AND DRIVING METHOD THEREOF

CROSS-REFERENCE TO RELATED APPLICATION

This application claims priority to and the benefit of Korean Patent Application No. 10-2012-0116685 filed in the Korean Intellectual Property Office on Oct. 19, 2012, the entire contents of which are incorporated herein by reference.

BACKGROUND (a) Field

The present invention relates to a pixel, a 3-dimensional image display device including the pixel, and a driving method thereof.

(b) Description of the Related Art

Flat panel display devices include a liquid crystal display (LCD), a field emission display (FED), a plasma display panel (PDP), and an organic light emitting diode (OLED) display.

Among the flat panel display devices, the organic light emitting display device displays an image by using an organic light emitting diode that generates light by recoupling an electron and a hole. The organic light emitting display device has a rapid response speed, is driven by low power consumption, and has excellent emission efficiency, luminance, and viewing angle. In this regard, the organic light emitting display device includes a plurality of pixels each including an organic light emitting diode that generates light of a luminance corresponding to a data current supplied from the pixel.

Digital driving, which is one of the gray expression methods of the organic light emitting diode display, adjusts a time when the organic light emitting diode of the pixel is lighted. In the case of the organic light emitting diode (OLED) display that uses the digital driving method, one frame is divided into a plurality of sub-frames and a light emitting period of each sub-frame is appropriately set in order to display a gray level. The pixel emits light during a sub-frame selected depending on an image signal for gray expression among the plurality of sub-frames constituting one frame.

In order to display a stereoscopic image, at least two images corresponding to two different view points are displayed within one frame display period. A stereoscopic image display device may display a left eye image and a right eye image corresponding to both eyes, a left eye and a right eye, within one frame period.

That is, one frame period may be divided into a left-eye image section and a right-eye image section and may include a left-eye image display period displaying the left-eye image in the left-eye image section and a right-eye image display period displaying the right-eye image in the right-eye image section.

According to a field sequential driving method, scanning of a display panel is sequentially performed from top to bottom, and the scan driver becomes very fast according to a conventional technology that divides one frame into a plurality of sub-frames for stereoscopic image realization. For example, scan speed for realization of the stereoscopic image may be further increased if a black image display period for displaying the entire display screen with a black image is included between a left eye image period and a right eye image period to prevent crosstalk.

A light emission time period may be shortened and luminance may be decreased due to the insertion of the black image, and thus, luminance may be increased by increasing power consumption for providing the same luminance of a general driving method.

In addition, when a driving frequency is high in a large-scaled display panel, image display becomes inaccurate in the display panel and driving power consumption in a driver of the display device is increased to the high driving frequency. This eventually increases the price of the stereoscopic image display device.

The above information disclosed in this Background section is only for enhancement of understanding of the background of the invention, and therefore, it may contain information that does not form the prior art that is already known in this country to a person of ordinary skill in the art.

SUMMARY

An exemplary embodiment of the present invention provides a stereoscopic image display device using a field sequential driving method, a pixel that can reduce a luminance loss in the stereoscopic image display device, and a method for driving the same.

In addition, the present invention provides a stereoscopic image display device that can prevent luminance deterioration and provide an accurate and clear stereoscopic image in a large-scaled image display panel by changing a driving speed to a low frequency, and a method for driving the same.

While this invention is described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

A stereoscopic image display device according to an exemplary embodiment of the present invention includes: a display panel including a plurality of pixels configured to emit light according to stored data voltages during corresponding sub-frames of a corresponding frame; a scan driver for transmitting scan signals to the pixels; a gate driver for transmitting an initialization control signal, a compensation control signal, and an emission control signal to the pixels; a data driver for transmitting first image data signals and second image data signals, which correspond to a different view point from that of the first image data signals, to the pixels; and a controller for controlling operation of the scan driver, the gate driver, and the data driver, and for generating and transmitting the first image data signals and the second image data signals according to an external image signal. The corresponding sub-frames include a first sub-frame that includes: a first period for initializing the stored data voltages of the pixels that correspond to third image data signals transmitted in a previous sub-frame of a previous frame to an initialization voltage; a second period for changing the stored data voltages of the pixels to correspond to the first image data signals written in the previous sub-frame for light emission in the first sub-frame and for compensating a threshold voltage of a driving transistor of each pixel; a third period for sequentially writing second data voltages, which correspond to the second image data signals of a second sub-frame of the corresponding frame, to the pixels; and a fourth period, configured to be concurrent with and as long as or longer than the third period, for emitting light from the pixels according to the stored data voltages that correspond to the first data signals.

A view point of the second image data signals and the third image data signals may correspond to the same view point, and the view point of the second and third image data signals may be different from a view point of the first image data signals.

The first image data signals may be left eye image data signals, and the second and third image data signals may be right eye image data signals.

Each of the pixels may be coupled to a scan line for transmitting a corresponding one of the scan signals, an initialization control line for transmitting the initialization control signal, a compensation control line for transmitting the compensation control signal, an emission control line for transmitting the emission control signal, and a data line for transmitting a corresponding one of the first, second, and third image data signals.

The gate driver may include an initialization driver for generating and transmitting the initialization control signal, a compensation driver for generating and transmitting the compensation control signal, and a light emission driver for generating and transmitting the emission control signal.

The stereoscopic image display device may further include a power supply for supplying a first power voltage and a second power voltage for driving the pixels and an initialization voltage for initializing each of the pixels.

The pixels of the display panel may be configured to be concurrently operated during the first, second, and fourth periods, and the pixels of the display panel may be configured to be sequentially operated in each pixel line during the third period.

During the first period, a gate electrode terminal of a driving transistor of each pixel may be configured to be applied with an initialization voltage in response to the initialization control signal transmitted to the respective pixels to apply an on-bias voltage to the driving transistor.

The initialization voltage may be equivalent to a gate-on voltage of the driving transistor, and current paths passing through the driving transistors to organic light emitting diodes may be configured so not to be formed during the first period.

During the second period, written data voltages, which correspond to the first image data signals written to corresponding sustain capacitors of the pixels during the previous sub-frame, may be configured to be transmitted to corresponding storage capacitors of the pixels in response to the compensation control signal transmitted to the pixels, and a gate electrode and a drain electrode of the driving transistor of each pixel may be configured to be diode-connected in response to the compensation control signal.

During the third period, the second data voltages, which correspond to the second image data signals, may be configured to be stored in corresponding sustain capacitors of the pixels in response to scan signals sequentially transmitted to the pixels along scan lines.

During the fourth period, organic light emitting diodes of the pixels may emit light according to corresponding driving currents that correspond to the stored data voltages, which correspond to the first image data signals, in response to the emission control signal transmitted to the pixels.

The second sub-frame of the corresponding frame may include: a fifth period for initializing the stored data voltages of the pixels that correspond to first image data signals transmitted in the first sub-frame of the corresponding frame to the initialization voltage; a sixth period for changing the stored data voltages of the pixels to correspond to the second image data signals written in the first sub-frame for light emission in the second sub-frame and for compensating the threshold voltage of the driving transistor of each pixel; a seventh period for sequentially writing to the pixels fourth data voltages that correspond to fourth image data signals of a next sub-frame of a next frame; and an eighth period, configured to be concurrent with and as long as or longer than the seventh period, for emitting light from the pixels according to the stored data voltages that correspond to the second data signals.

A pixel according to an embodiment of the present invention includes: an organic light emitting diode; a first transistor for transmitting a driving current corresponding to a stored data voltage to the organic light emitting diode; a second transistor for transmitting a data voltage, which corresponds to a data signal having a view point that is different from that of a previous data signal that corresponds to the stored data voltage, in response to a scan signal; a sustain capacitor for storing the data voltage corresponding to the data signal; a storage capacitor for storing the stored data voltage, which corresponds to the data voltage then stored by the sustain capacitor, for light emission in a corresponding sub-frame; a third transistor for applying a reference voltage to a first electrode of the storage capacitor; a fourth transistor for initializing the stored data voltage with an initialization voltage applied to a second node to which a gate electrode of the first transistor and a second electrode of the storage capacitor are coupled; a fifth transistor for transmitting the data voltage from the sustain capacitor to the storage capacitor; a sixth transistor coupled between the gate electrode and a drain electrode of the first transistor for compensating a threshold voltage by diode-connecting the first transistor; a seventh transistor for applying a driving power voltage of a high level to the first electrode of the storage capacitor while the organic light emitting diode emits light; and an eight transistor for transmitting the driving current to the organic light emitting diode for light emission while a next sub-frame's data voltage is written to the sustain capacitor via the second transistor.

The first transistor may include the gate electrode coupled to the second electrode of the storage capacitor, a source electrode coupled to a supply source of the driving power voltage, and the drain electrode coupled to a first electrode of the sixth transistor.

The second transistor may include a gate electrode coupled to a scan line for transmitting the scan signal, a source electrode coupled to a data line for supplying the data signal, and a drain electrode coupled to a source electrode of the fifth transistor.

The sustain capacitor may include a first electrode coupled to a first node to which a drain electrode of the second transistor and a source electrode of the fifth transistor are commonly coupled, and a second electrode coupled to a supply source of the initialization voltage.

The storage capacitor may include the first electrode coupled to the second node, to which a drain electrode of each of the fifth, seventh, and third transistors is coupled, and the second electrode coupled to a first node to which the gate electrode of the first transistor, a second electrode of the sixth transistor, and a drain electrode of the fourth transistor are coupled.

The third transistor may include a gate electrode coupled to an initialization control line for transmitting an initialization control signal, a source electrode coupled to a data line for transmitting the reference voltage, and a drain electrode coupled to the first electrode of the storage capacitor.

The fourth transistor may include a gate electrode coupled to an initialization control line for transmitting an initialization control signal, a source electrode coupled to a supply source of the initialization voltage, and a drain electrode coupled to the second electrode of the storage capacitor.

The fifth transistor may include a gate electrode coupled to a compensation control line for transmitting a compensation control signal, a source electrode coupled to a first electrode of the sustain capacitor, and a drain electrode coupled to the first electrode of the storage capacitor.

The sixth transistor may include a gate electrode coupled to a compensation control line for transmitting a compensation control signal, a first electrode coupled to the drain electrode of the first transistor, and a second electrode coupled to the gate electrode of the first transistor.

The seventh transistor may include a gate coupled to an emission control line for transmitting an emission control signal, a source electrode coupled to a supply source of the driving power voltage, and a drain electrode coupled to the first electrode of the storage capacitor.

The eight transistor may include a gate electrode coupled to an emission control line for transmitting an emission control signal, a source electrode coupled to the drain electrode of the first transistor, and a drain electrode coupled to an anode of the organic light emitting diode.

The pixel may be configured such that during a first period during which an initialization control signal is transmitted as a gate-on voltage level in one sub-frame, the third and fourth transistor are turned on, and thus, a gate electrode voltage of the first transistor is applied as an initialization voltage and an on-bias voltage is applied to the first transistor.

The pixel may be configured such that during a second period during which a compensation control signal is transmitted as a gate-on voltage level in one sub-frame, the fifth transistor is turned on and transmits the data voltage according to a first image data signal, stored in the sustain capacitor, to the storage capacitor and the sixth transistor is turned on to diode-connect the first transistor.

The driving power voltage for driving the pixel may be configured to be changed from the high level to a low level during the second period.

The pixel may be configured such that during a third period, during which the scan signal is transmitted as a gate-on voltage level in one sub-frame, the second transistor is turned on, and thus, transmits the next sub-frame's data voltage corresponding to a second image data signal to the sustain capacitor.

The pixel may be configured such that, during a fourth period during which an emission control signal is transmitted as a gate-on voltage level in one sub-frame, the seventh transistor is turned on to transmit a high-level driving power voltage to the first electrode of the storage capacitor and the eight transistor is turned on, and thus, a path of the driving current according to a first image data signal is formed to the organic light emitting diode.

The fourth period may be configured to be concurrent with and equal to or longer in duration than a third period during which the scan signal is configured to be transmitted as a gate-on voltage level.

A view point corresponding to the data voltage may be different from a view point corresponding to the next sub-frame's data voltage.

The data voltage may correspond to a left eye image data signal, and the next sub-frame's data voltage may correspond to a right eye image data signal.

A method for driving a stereoscopic image display device including a plurality of pixels coupled to corresponding scan lines, initialization control lines, compensation control lines, emission control lines, and data lines and for emitting light according to stored data voltages during corresponding sub-frames of a corresponding frame may include: initializing the stored data voltages, which correspond to a previous sub-frame of a previous frame, in the pixels to initialization voltages in response to an initialization control signal transmitted through the initialization control lines; changing the stored data voltages in a storage capacitor of each pixel to correspond to first image data signals, the first image data signals being written in a previous sub-frame for light emission in the corresponding sub-frame, and compensating for a threshold voltage of a driving transistor of each pixel in response to a compensation control signal transmitted through the compensation control lines; writing second data voltages corresponding to second image data signals, of which a view point is different from that of the first image data signals, to sustain capacitors of the pixels in response to scan signals sequentially applied along a plurality of pixel lines; and emitting light with a driving current corresponding to the stored data voltage corresponding to the first image data signals from the pixels in response to an emission control signal transmitted through the emission control lines.

The light emission may be performed separately from the writing of the second data voltage according to the second image data signals to the sustain capacitor in each pixel.

The light emission may be performed in the same period as the writing of the second data voltage corresponding to the second image data signals, or performed during a period that is concurrent with and longer than the writing of the second data voltage corresponding to the second data signals.

The first image data signals may be left eye image data signals, and the second image data signals and the third image data signals may be right eye image data signals.

A driving voltage of a high potential that drives the pixels may be transmitted as a low voltage level while the stored data voltage according to the first image data signals are transmitted to the storage capacitors the pixels and the threshold voltages of the driving transistors the pixels are compensated.

According to the present invention, the stereoscopic image display device displaying a stereoscopic image can be driven with low frequency so that luminance loss can be prevented and power consumed for image displaying can be saved.

In addition, scan or data writing period of the display panel can be sufficiently assured in driving of the display device, gray can be accurately realized and a stereoscopic image can be stably and clearly realized in a large-scaled display panel of the stereoscopic image display device.

DETAILED DESCRIPTION

Figure 1:
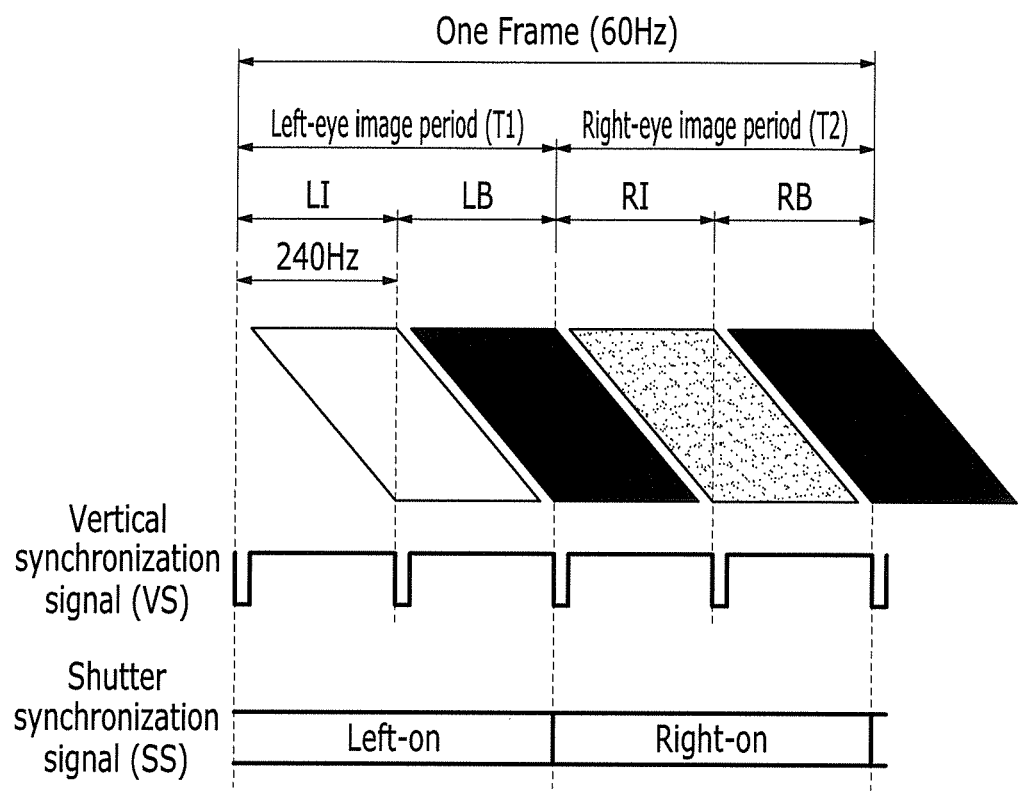
FIG. 1 is a frame schematic diagram and a driving waveform diagram of a stereoscopic image display device according to a comparative example.

Hereinafter, exemplary embodiments according to the present invention will be described in detail with reference to accompanying drawings so as to be easily understood by a person of ordinary skill in the art. However, the present invention can be variously implemented and is not limited to the following embodiments.

Elements not necessary for the understanding of the present invention may be omitted to more clearly describe aspects of the present invention. In the following detailed description, like elements will be designated by like reference numerals throughout.

Throughout this specification and the claims that follow, when it is described that an element is "coupled" to another element, the element may be "directly coupled" to the other element or "electrically coupled" to the other element through one or more intervening elements. In addition, unless explicitly described to the contrary, the word "comprise" and variations such as "comprises" or "comprising" will be understood to imply the inclusion of stated elements but not the exclusion of any other elements.

FIG. 1 is a frame schematic diagram of a driving waveform diagram of a driving method of a stereoscopic image display device according to a comparative example.

FIG. 1 illustrates a realization method of a stereoscopic image display device realized during one frame (i.e., frame 1) in the stereoscopic image display device driven according to a comparative example field progressive driving method.

Referring to FIG. 1, one frame is driven at 60 Hz and sub-frames are driven at 240 Hz, respectively, in the comparative example stereoscopic image driving method.

In the stereoscopic image driving using a display panel driven by a sequential driving method, one frame is divided into a left eye image period T1 and a right eye image period T2, and each period is divided into sub-frames of an image display period and a black image display period.

The left eye image period T1 includes a left eye image display period LI during which a left eye image is displayed and a black image display period LB during which a black image is displayed.

The right eye image period T2 includes a right eye image display period RI during which a right eye image is displayed and a black image display period RB during which a black image is displayed.

Image data corresponding to each period is written before an image corresponding to each sub-frame is displayed. That is, the respective pixels of the display panel are sequentially activated during the left eye image display period LI, and thus, left eye image data is written to each pixel. Accordingly, the respective pixels sequentially emit light according to the left eye image data during the left eye image display period LI to display a left eye image.

In each of the black image display periods LB and RB, when the respective pixels are sequentially activated, black data is written to each pixel, and thus, a black image is displayed during each of the black image display periods LB and RB. Here, the black data implies image data included in a suitable (or predetermined) low-gray luminance range that expresses a black image.

As described, a sub-frame displaying a black image is inserted after a sub-frame displaying a left eye image or a right eye image to clearly separate a right eye image from a left eye image and to suppress crosstalk due to the co-existence of left and right images.

Referring to FIG. 1, for example, frame 1 is driven at 60 Hz, the left eye image display period LI, the black image display period LB, the right image display period RI, and the black image display period RB forming frame 1 are respectively driven at 240 Hz.

In the respective image display periods, scan signals are sequentially transmitted to a plurality of pixels included in the display panel and data information according to the image data signal is written to the pixel. The first scan signal among the plurality of scan signals transmitted to the respective pixels is synchronized by a vertical synchronization signal VS that is transmitted in an initial stage of each of the image display periods. That is, scanning of each of the plurality of pixels included in the display panel of the stereoscopic image display is started by the first scan signal that is synchronized by the vertical synchronization signal VS, and thus, activates pixels included in the first pixel line of the display panel.

Shutter glasses that recognize the left eye image and the right eye image are used in order to implement a stereoscopic image. The shutter glasses are formed of a left eye lens correspond to a left eye and a right eye lens corresponding to a right eye.

The shutter glasses open the left eye lens corresponding to a shutter synchronization signal SS and at the same time block the right eye lens in the left eye image period T1, and open the right eye lens corresponding to the shutter synchronization signal SS and at the same time block the left eye lens in the right eye image period T2.

Thus, the opened left eye of the shutter glasses sequentially recognizes a left eye image and a black image during a left-on period of the left eye lens.

In addition, the opened right eye of the shutter glasses sequentially recognizes a right eye image and the black image during a right-on period of the right eye lens.

However, insertion of the black image for separation of the left and right images and prevention of crosstalk causes inaccurate images to be displayed in a large-sized display panel because each sub-frame is driven at a speed of about 240 Hz during one frame that is driven at 60 Hz and causes an increase in power consumption. Due to the black image, luminance is reduced to the half, and thus, two times the gray level voltage is required for realization of the same luminance, thereby causing an increase in the driving power. Further, the black image insertion scheme cannot completely separate a left eye image and a right eye image.

A stereoscopic image display device and a driving method thereof according to the present invention realizes an accurate stereoscopic image by completely removing crosstalk and preventing luminance loss, while reducing power consumption.

Figure 2:
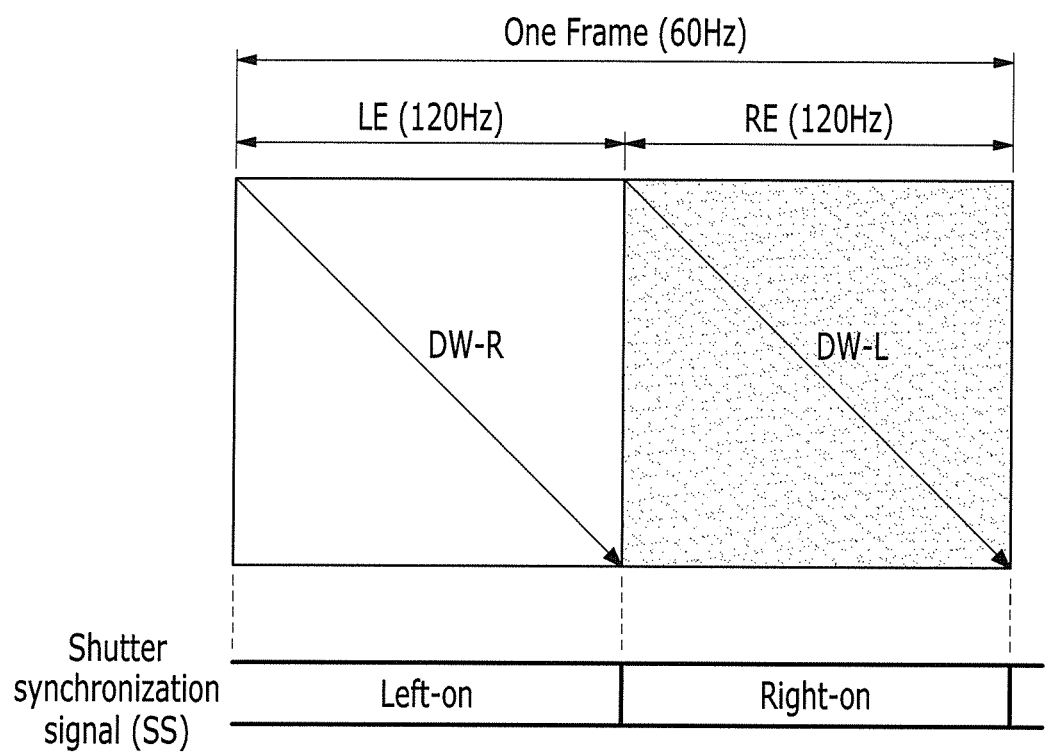
FIG. 2 is a frame schematic diagram of a driving method of a stereoscopic image display device according to an exemplary embodiment of the present invention.

FIG. 2 is a frame schematic diagram of a stereoscopic image display device and a driving method thereof according to an exemplary embodiment of the present invention.

Referring to FIG. 2, in a driving method of a stereoscopic image display device according to exemplary embodiment of the present invention, one frame (frame 1) is divided into a left eye image period LE (or sub-frame) and a right eye image period RE (or sub-frame) for driving.

When one frame is driven at 60 Hz, each sub-frame is driven at 120 Hz. The comparative example stereoscopic image display method has a problem of increasing a driving frequency of an image display period because a black image display period is inserted after each image display period, but according to the driving method of the present embodiment of the present invention, a black image display period is not inserted so that a driving frequency of each image period can be decreased.

The left eye image period LE is a period during which a pixel emits light with a current corresponding to a left eye image data signal to display a left eye image, and in this case, each pixel is written with a right eye image data signal while displaying the left eye image. That is, the left eye image period EL during which the plurality of pixels display the left eye image becomes a right eye data writing period DW-R for writing of a right eye image data signal.

After the end of the left eye image period LE, a plurality of pixels of a display panel 10 emit light with a driving current corresponding to the right eye image data signal transmitted during the right eye data writing period DW-R to display a right eye image. A period during which the right eye image is displayed is a right eye image period RE. During the right eye image period RE, the plurality of pixels display a right eye image and concurrently a left eye image data signal is written to the pixels. That is, the right eye image period RE, during which the plurality of pixels of the display panel 10 display a right eye image, is also a left eye data writing period DW-L. The plurality of pixels of the display panel 10 emit light in a sub-frame of a left-eye image period of the next frame according to a driving current corresponding to the left eye image data signal.

As described, a single frame is one of a plurality of image frames sequentially displayed, and thus, a left eye image or a right eye image is alternately displayed, and concurrently, an image data signal of the opposite view point (e.g., an opposite eye image data) is alternately written. A left eye image and a right eye image may be separated without insertion of a black image because light emission is concurrently (or simultaneously) and wholly performed rather than being performed after sequential writing of the left eye image and the right eye images. In addition, because the image data signal of the opposite view point of a time point that corresponds to the light-emitted image is written during the concurrent light emission period, the driving frequency can be decreased.

During the left eye image period LE of FIG. 2, a left eye lens of shutter glasses is opened (i.e., left-on) by a shutter synchronization signal SS, and thus, the left eye recognizes a left eye image. In addition, during the right eye image period RE, a right eye lens is opened (i.e., right-on) of the shutter glasses by the shutter synchronization signal SS, and thus, a right eye recognizes a right eye image.

Figure 3:
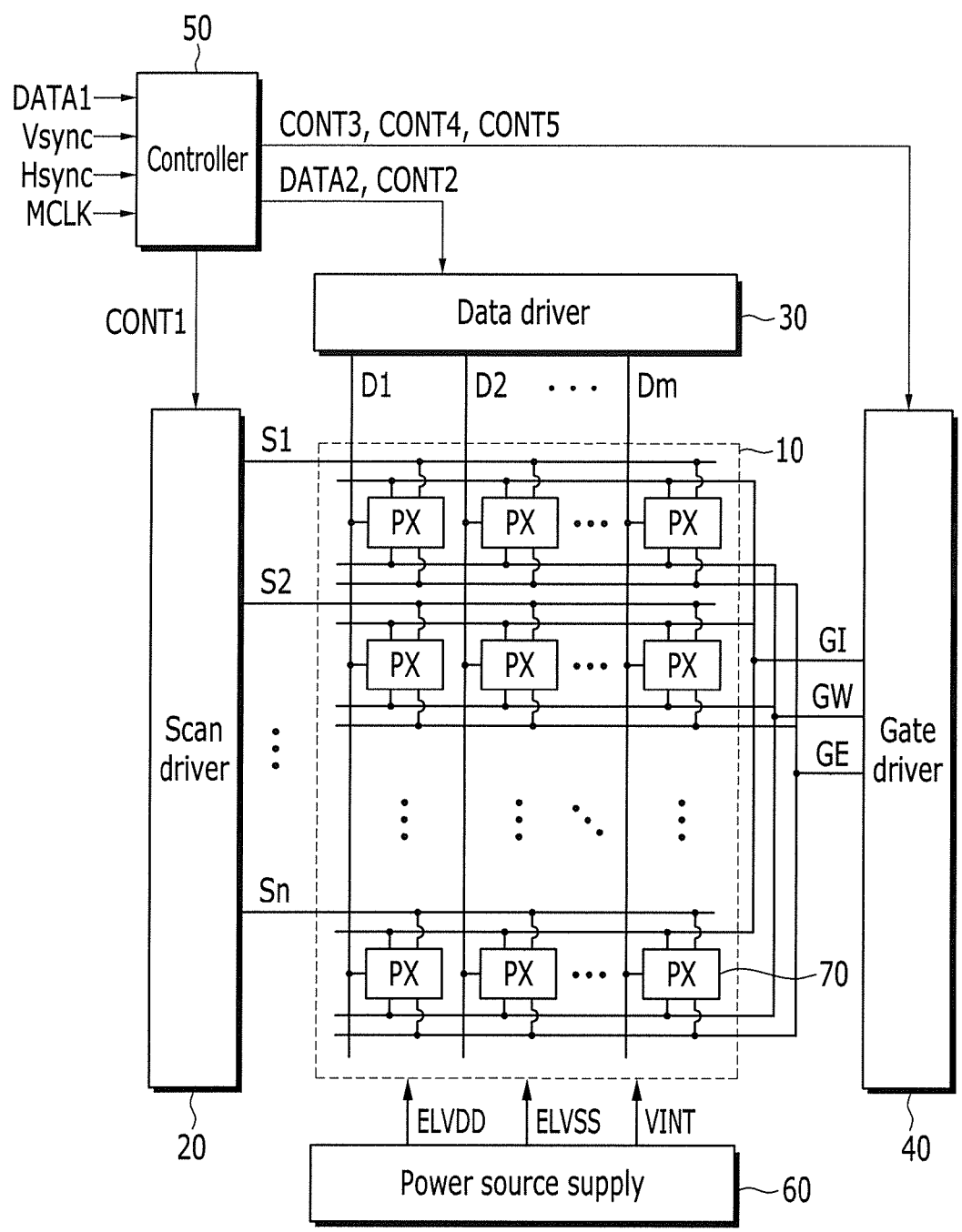
FIG. 3 is a block diagram of the stereoscopic image display device according to the exemplary embodiment of the present invention.

FIG. 3 is a schematic block diagram of the stereoscopic image display device for performing the driving method according to the exemplary embodiment of the present invention.

Referring to FIG. 3, the stereoscopic image display device according to the exemplary embodiment of the present invention includes the display panel 10, a scan driver 20, a data driver 30, a gate driver 40, a control portion 50, and a power supply 60.

The display panel 10 includes a plurality of pixels 70 respectively coupled to a plurality of scan lines S1 to Sn, a plurality of data lines D1 to Dm, a plurality of first control lines GI (hereinafter, referred to as initialization control lines), a plurality of second control lines GW (hereinafter, referred to as compensation control lines), and a plurality of third control lines GE (hereinafter, referred to emission control lines).

The scan driver 20 generates and supplies scan signals respectively corresponding to the scan lines S1 to Sn.

The data driver 30 supplies an image data signal according to an image signal input from an external source to the data lines D1 to Dm. Here, the image data signal includes a left eye image data signal and a right eye image data signal for displaying a stereoscopic image.

The gate driver 40 generates and supplies a first control signal (hereinafter, referred to as an initialization control signal), a second control signal (hereinafter, referred to as a compensation control signal), and a third control signal (hereinafter, referred to as an emission control signal) respectively corresponding to the plurality of initialization control lines GI, the plurality of compensation control lines GW, and the plurality of emission control lines GE.

The control portion 50 processes an image signal DATA1 supplied from an external image source to display a stereoscopic image in the display panel 10 to generate an image data signal DATA2, and transmits the same. In addition, the controller 50 generates control signals CONT1 to CONT5 for controlling the scan driver 20, data driver 30, and gate driver 40, and transmits the control signals CONT1 to CONT5 to the corresponding driver.

The power supply 60 supplies a first power voltage ELVDD and a second power voltage ELVSS for driving each pixel 70 of the display panel 10, and supplies an initialization voltage Vint for initialization of previous image data writing to each frame.

In an embodiment of the present invention, the plurality of pixels 70 included in the display panel 10 may be arranged in a matrix format, and the plurality of pixels 70 may form one pixel row by being arranged along a first direction (i.e., horizontal direction) and the plurality of pixels 70 may form one pixel column by being arranged along a second direction (i.e., vertical direction).

In FIG. 3, the plurality of pixels 70 included in each of the plurality of pixel lines are coupled to scan lines S1 to Sn corresponding to the corresponding pixel lines among the plurality of scan lines S1 to Sn. For example, a plurality of pixels 70 included in the n-th pixel line are coupled to the n-th scan line Sn corresponding to the n-th pixel line. The plurality of pixels 70 may be coupled to a first gate line G1 and a second gate line G2.

In the display panel 10, the plurality of pixel columns may respectively be coupled to the corresponding data lines among the plurality of data lines D1 to Dm.

Thus, the plurality of pixels 70 included in the display panel 10 may be sequentially activated by the scan signals, which are sequentially transmitted thereto, along the pixel lines, and may display an image according to the corresponding image data signal applied through the corresponding data line coupled to the plurality of pixels 70 included in each pixel line.

The plurality of pixels 70 included in each of the plurality of pixel lines may be coupled with the corresponding initialization control line among the plurality of initialization control lines GI, the corresponding compensation control line among the plurality of compensation control lines GW, and the corresponding emission control line among the plurality of emission control lines GE.

According to an embodiment of the present invention, each of the plurality of pixels 70 performs initialization of a data voltage written in the previous frame, compensation of a threshold voltage of a driving transistor, and emission control while performing a driving process for realizing an image by receiving the initialization control signal, the compensation control signal, and the emission control signal through the plurality of control lines GI, GW, and GE, respectively.

In FIG. 3, the control portion 50 receives the image signal DATA1 and an input control signals (e.g., Vsync, Hsync, MCLK) that control displaying of the same from an external source.

The image signal DATA1 may include information of luminance or color coordinates of each pixel 70. Luminance may have a suitable (or predetermined) number of grays (e.g., gray levels), for example, $1024=2^{10}$, $256=2^8$, or $64=2^6$.

The control portion 50 may generate an image data signal DATA2 and various control signals CONT1 to CONT5 from the image signal DATA1 and the input control signals (e.g., Vsync, Hsync, MCLK).

According to an embodiment of the present invention, the image data signal DATA2 includes a right eye image data signal and a left eye image data signal, which are divided for each frame for displaying a stereoscopic image. The control portion 50 may generate the image data signal DATA2 of the left eye image signal and the right eye image data signal for realization of stereoscopic image by converting the externally supplied image signal DATA1.

The stereoscopic image display device according to the exemplary embodiment of the present invention sequentially displays a left eye image and a right eye image corresponding to both eyes to display a stereoscopic image. Additional shutter glasses are used to selectively transmit the left eye image and the right eye image to the corresponding eye. For example, a user may wear glasses that allow an image to be transmitted in only the left eye during a period of displaying the left eye image and to be transmitted in only the right eye during a period of displaying the right eye image.

The image data signal DATA2 is transmitted to the data driver 30.

In addition, the input control signal may include a vertical synchronization signal Vsycn, a horizontal synchronization signal Hsycn, a main clock signal MCLK, and a data enable signal.

The control portion 50 may process the image signal DATA1 and the input control signals according to operation conditions of the display panel 10 and the data driver 30 to generate the image data signal DATA2 for realization of the stereoscopic image and control signals for controlling operation of the respective drivers.

For example, the control portion 50 generates and transmits the scan driving control signal CONT1, and generates a data driving control signal CONT2, and transmits the same to the data driver 30. The controller 50 may generate gate driving control signals CONT3 to CONT5, and may transmit the generated signals to the gate driver 40.

The gate driving control signal may include an initialization driving control signal CONT3 for controlling generation and transmission of the initialization control signal of the gate driver 40, a compensation driving control signal CONT4 for controlling generation and transmission of the compensation control signal of the gate driver 40, and an emission driving control signal CONT5 for controlling generation and transmission of the emission control signal of the gate driver 40.

In the exemplary embodiment of the present invention illustrated in FIG. 3, the plurality of gate lines are coupled to one gate driver 40, that is, the initialization control line GI, the compensation control line GW, and the emission control line GE are coupled to the respective pixels, and thus, the corresponding control signals are generated and transmitted, but the present invention is not limited thereto. Instead, embodiments of the stereoscopic image display device according to the present invention may further include an initialization driver coupled to the respective pixels 70 of the display panel through the plurality of initialization control lines GI, a compensation driver coupled with the respective pixels 70 of the display panel 10 through the plurality of compensation control lines GW, and an emission driver coupled with the respective pixels 70 of the display panel 10 through the plurality of emission control signals GE. In this case, the gate driving control signals CONT3 to CONT5 are transmitted to the respective drivers for control operations related to generation and transmission of the control signals.

The scan driver 20 may receive the scan driving control signal CONT1 for controlling the operation of the scan driver 20 from the control portion 50, and may generate and transmit a scan signal to the corresponding scan line among the plurality of scan lines S1 to Sn.

The scan signal transmitted to the corresponding scan line may have a gate-on voltage, the plurality of pixels 70 coupled to the scan line are selected and activated by the scan line. The selected pixels may receive the corresponding left or right eye image data signal from the plurality of data lines D1 to Dm.

The driving frequency of the plurality of scan signals transmitted to the entire pixels of the display panel 10 may be controlled by the scan driving control signal CONT1. Here, the scan driver 20 supplies a plurality of scan signals per sub-frame with a driving speed according to the scan driving control signal CONT1. Because the stereoscopic image display device according to the present invention divides one frame into two sub-frames, that is, one frame is divided into a left eye image period and a right eye image period, a driving speed for transmission of the plurality of scan signals may be decreased.

The data driver 30 may supply a plurality of image data signals of a corresponding sub-frame among a plurality of sub-frames included in one frame through the plurality of data lines D1 to Dm during the left eye image display period and the right eye image display period.

The data driver 30 may supply a plurality of left eye image data signals and a plurality of right eye image data signals transmitted according to the data driving control signal CONT2 received from the control portion 50 to the plurality of data lines D1 to Dm.

The data driver 30 may transmit the plurality of image data signals through the plurality of data lines D1 to Dm to the respective pixels, which are synchronized and activated when the scan signal, having a gate-on voltage corresponding to each sub-frame, is supplied. The gate-on voltage may be a voltage having a level that turns on a transistor included in the pixel 70.

A plurality of left eye data signals corresponding to the left eye image display period and a plurality of right eye data signals corresponding to the right eye image display period may be transmitted through the plurality of data lines D1 to Dm.

In addition, the gate driver 40 may receive the gate driving control signals CONT3 to CONT5 for controlling initialization, compensation of threshold voltage, and emission from the control portion 50, and may generate a plurality of control signals corresponding to the received signals, for example, an initialization control signal, a compensation control signal, and an emission control signal, and may transmit the generated signals to each pixel 70 of the display panel 10. The initialization control signal may be transmitted through the corresponding initialization control line GI, the compensation control may be transmitted through the corresponding compensation control line GW, and the emission control signal may be supplied through the corresponding emission control line GE.

Because the initialization control line GI, the compensation control line GW, and the emission control line GE may be coupled to all of the pixels 70 of the display panel 10, the plurality of pixels 70 may be concurrently (or simultaneously) operated according to the initialization control signal, the compensation control signal, and the emission control signal respectively transmitted from the initialization control lines GI, the compensation control line GW, and the emission control line GE.

Here, the power supply 60 of the stereoscopic image display device according to the exemplary embodiment of the present invention illustrated in FIG. 3 supplies a driving power voltage for driving each pixel 70 of the display panel 10 and an initialization voltage Vint for initialization. The driving power voltage may include a first power voltage ELVDD of a suitable (or predetermined) high level and a second power voltage ELVSS of a suitable (or predetermined) low level.

Figure 4:
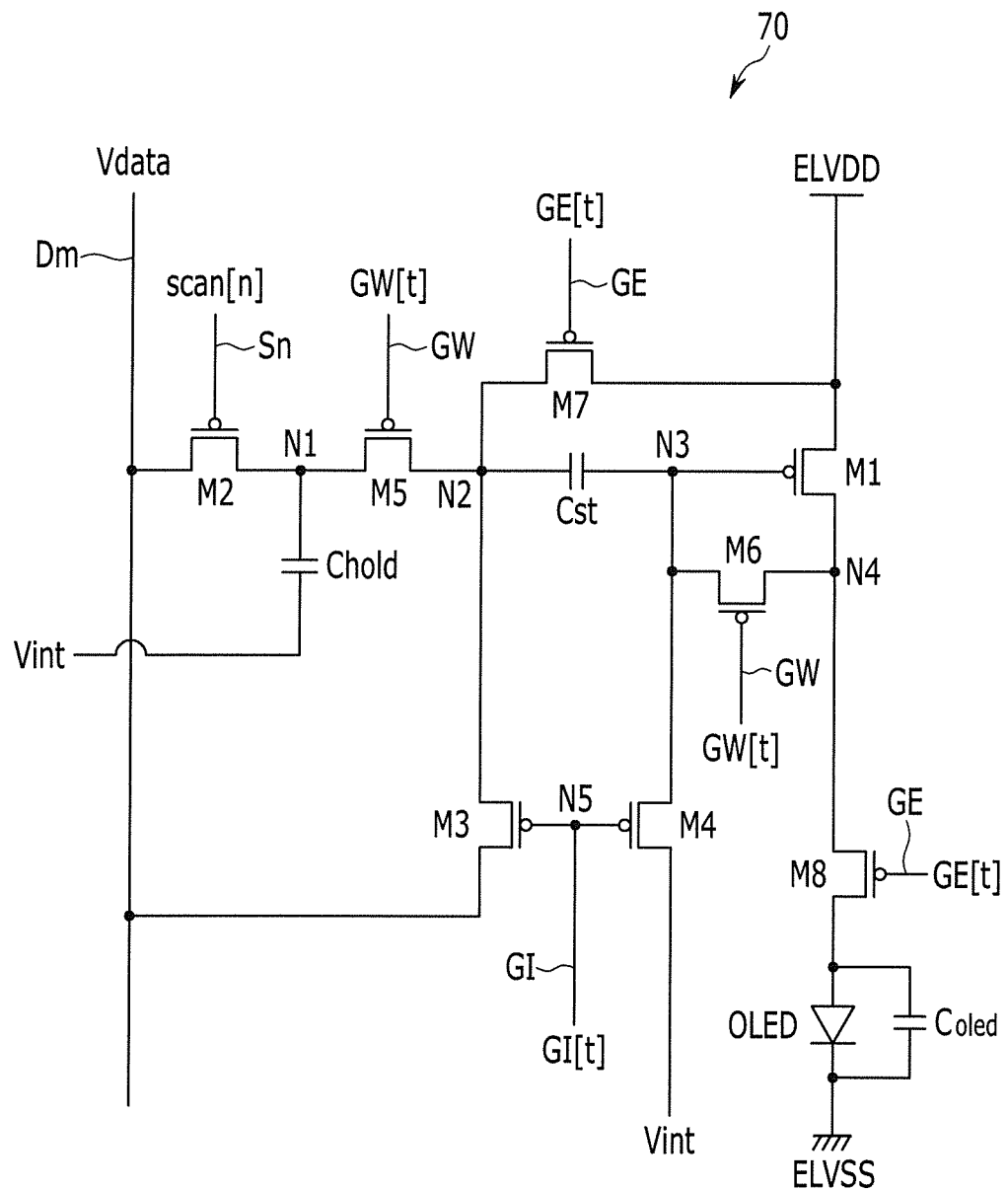
FIG. 4 is a circuit diagram of a pixel circuit structure in the stereoscopic image display device shown in FIG. 3.

FIG. 4 is a circuit diagram of a pixel 70 included in the display panel 10 of the stereoscopic image display device of FIG. 3. The pixel 70 is a pixel corresponding to the m-th pixel column along the plurality of pixels included in the n-th pixel line, and is coupled to the n-th scan line Sn and the m-th data line Dm.

The pixel 70 of FIG. 4 includes eight transistors M1 to M8, two capacitors Chold and Cst (here, a capacitor Coled coupled between organic light emitting diode electrodes will be excluded), and an organic light emitting diode OLED.

The organic light emitting diode OLED emits light correspond to a driving current according to an image data signal.

A first transistor M1 includes a source electrode coupled to a power source of the first power voltage ELVDD, a gate electrode coupled to a third node N3, and a drain electrode coupled to a fourth node N4. The first transistor M1 controls the organic light emitting diode OLED to emit light by supplying a driving current thereto corresponding to a data voltage according to an image data signal corresponding to the pixel 70. Hereinafter, the first transistor M1 will be referred to as a driving transistor.

A second transistor M2 includes a source electrode coupled to the m-th data line Dm among the plurality of data lines, a gate electrode coupled to the n-th scan line Sn corresponding to the pixel 70 among the plurality of scan lines, and a drain electrode coupled to a first node N1. The second transistor M2 transmits a data voltage Vdata according to the image data signal applied to the m-th data line Dm to the first node N1, and switches the data voltage Vdata to the gate electrode of the driving transistor M1 in response to the scan signal scan[n] applied to the n-th scan line Sn. Hereinafter, the second transistor M2 is referred to as a switching transistor.

The third transistor M3 may include a source electrode coupled to the m-th data line Dm among the plurality of data lines, a gate electrode coupled to the initialization control line GI coupled to the pixel 70, and a drain electrode coupled to a second node N2.

The fourth transistor M4 may include a source electrode coupled to a supply source of an initialization voltage Vint, a gate electrode coupled to the initialization control line GI, and a drain electrode coupled to the third node N3.

The respective gate electrodes of the third transistor M3 and the fourth transistor M4 may be commonly coupled to a fifth node N5 to receive an initialization control signal GI[t] from the initialization control line GI. When emission of an image at one view point of the stereoscopic image is terminated, in response to the initialization control signal GI[t], the third transistor M3 and the fourth transistor M4 may respectively transmit a suitable (or predetermined) reference voltage Vsus and the initialization voltage Vint to corresponding electrodes of the storage capacitor Cst, and may initialize a data voltage previously written in the storage capacitor Cst.

For example, the third transistor M3 may transmit the reference voltage Vsus applied through the data line Dm to the second node N2 to which a first electrode of the storage capacitor Cst is coupled in response to the initialization control signal GI[t].

And, concurrently, the fourth transistor M4 may transmit the initialization voltage Vint applied through the initialization voltage supply source to the third node N3 to which a second electrode of the storage capacitor Cst is coupled in response to the initialization control signal GI[t].

Accordingly, the storage capacitor Cst (charged with the previously written data voltage) is then charged with a voltage corresponding to a difference between the reference voltage applied to both electrodes thereof and the initialization voltage, and thus, the storage capacitor Cst is initialized.

Concurrent with the initialization process, an on-bias voltage may be applied to the third node N3 (to which the gate electrode of the driving transistor M1 is coupled) by operation of the fourth transistor M4. Here, the on-bias voltage is a gate-on voltage of a level that turns on the driving transistor M1, and when the on-bias voltage is applied to the gate electrode terminal, the driving transistor M1 is turned on. However, a current path through the driving transistor M1 is not generated, and thus, the organic light emitting diode OLED does not emit light. This is because the eighth transistor M8 that controls emission of the organic light emitting diode OLED is in the Turn-off state so that no driving current may flow. By applying the on-bias voltage to the gate electrode of the driving transistor M1, the occurrence of hysteresis of the respective driving transistor due to iterative data writing to each pixel can be prevented.

The fifth transistor M5 may include a source electrode coupled to the first node N1, a gate electrode coupled to the compensation control line GW coupled to the pixel 70, and a drain electrode coupled to the second node N2. The fifth transistor M5 may receive a compensation control signal GW[t] from the compensation control line GW, and may transmit the data voltage Vdata (according to the image data signal applied to the first node N1) to the second node N2 in response to the compensation control signal GW[t]. For example, the fifth transistor M5 transmits the data voltage Vdata (according to the image data signal applied to the first node N1, and thus, stored in the sustain capacitor Chold) to the second node N2 to which the first electrode of the storage capacitor Cst is coupled. In this case, the data voltage Vdata is transmitted to the second node N2, and thus stored in the storage capacitor Cst, and an image according to a driving current that corresponds to the data voltage is displayed during the sequentially continued light emission period.

The sixth transistor M6 may include a gate electrode coupled to the compensation control line GW coupled to the pixel 70, a first electrode, and a second electrode. The first and second electrodes may respectively be coupled to the gate electrode and the drain electrode of the driving transistor M1. The sixth transistor M6 may receive the compensation control signal GW[t] from the compensation control line GW, and may diode-connect the driving transistor M1 by coupling the gate electrode and the drain electrode of the driving transistor M1 in response to the compensation control signal GW[t]. A threshold voltage Vth of the driving transistor M1 may be applied to the gate electrode terminal of the driving transistor M1, and thus, the data voltage to which the threshold voltage Vth is reflected is stored in the storage capacitor Cst and the data voltage in the next light emission period is irrelevant to a threshold voltage deviation of driving transistors of the respective pixel so that an image can be accurately displayed.

The seventh transistor M7 may include a source electrode coupled to the supply source of the first power voltage ELVDD, a gate electrode coupled to the emission control line GE coupled to the pixel 70, and a drain electrode coupled to the second node N2. The seventh transistor M7 may receive the emission control signal GE[t] from the emission control line GE, and may apply the first power voltage ELVDD to the second node N2 in response to the emission control signal GE[t]. The first power voltage ELVDD applied to the second node N2 may be applied with a reference potential that affects the amount of driving current for light emission of the organic light emitting diode OLED during the light emission period. For example, the driving current amount may be controlled according to a voltage of the third node N3, which may be changed due to coupling of a voltage value (e.g., ELVDD−Vdata), which corresponds to a difference between the first power voltage ELVDD applied to the second node N2 and the data voltage Vdata according to the image data signal.

The eighth transistor M8 may include a source electrode coupled to the fourth node N4, a gate electrode coupled to the emission control line GE coupled to the pixel 70, and a drain electrode coupled to an anode of the organic light emitting diode OLED. The eighth transistor M8 may receive the emission control signal GE[t] from the emission control line GE, and may allow the driving current to flow (according to the data voltage) to the organic light emitting diode OLED from the fourth node N4 for the organic light emitting diode OLED to display an image according to the image data signal during a light emission period in response to the emission control signal GE[t].

The transistors of the pixel of FIG. 4 may be P channel electric field effect transistors (PMOS), but it is not so restricted. Thus, at least one transistor may be an N channel electric field effect transistor (NMOS). The gate-on voltage for turning on the PMOS transistors of FIG. 4 is a logic low level voltage, and the gate-off voltage for turning off the PMOS transistors is a logic high level voltage. In case of the NMOS transistor, the gate-on voltage and the gate-off voltage are opposite to those of the PMOS transistor.

The pixel 70 according to the exemplary embodiment of FIG. 4 may include the sustain capacitor Chold and the storage capacitor Cst.

The sustain capacitor Chold includes a first electrode coupled to the first node N1 and a second electrode coupled to the supply source of the initialization voltage Vint. The sustain capacitor Chold may be charged with a voltage corresponding to a difference between the data voltage transmitted to the first node N1 through the data line Dm and the initialization voltage. Hence, the sustain capacitor Chold may store the data voltage sequentially applied through the data line Dm and maintain the voltage during a period while the organic light emitting diode OLED emits light in one pixel.

The storage capacitor Cst includes the first electrode coupled to the second node N2 and the second electrode coupled to the third node N3. The storage capacitor Cst may receive and be charged with the data voltage stored (written in) the sustain capacitor Chold during the switching operation of the fifth transistor M5. The voltage stored in the storage capacitor Cst may be transmitted to the driving transistor M1 during the light emission period to display an image through light emission of the organic light emitting diode OLED. The storage capacitor Cst is charged with a voltage corresponding to a difference between voltages respectively applied to both electrodes thereof, and thus, initializes the gate electrode voltage of the driving transistor M1 after the light emission period is over.

An operation process of the stereoscopic image display device according to the exemplary embodiment of the present invention, including the pixel 70 of FIG. 4 will now be described with reference to driving waveform diagrams of FIG. 5 and FIG. 6.

Figure 5:
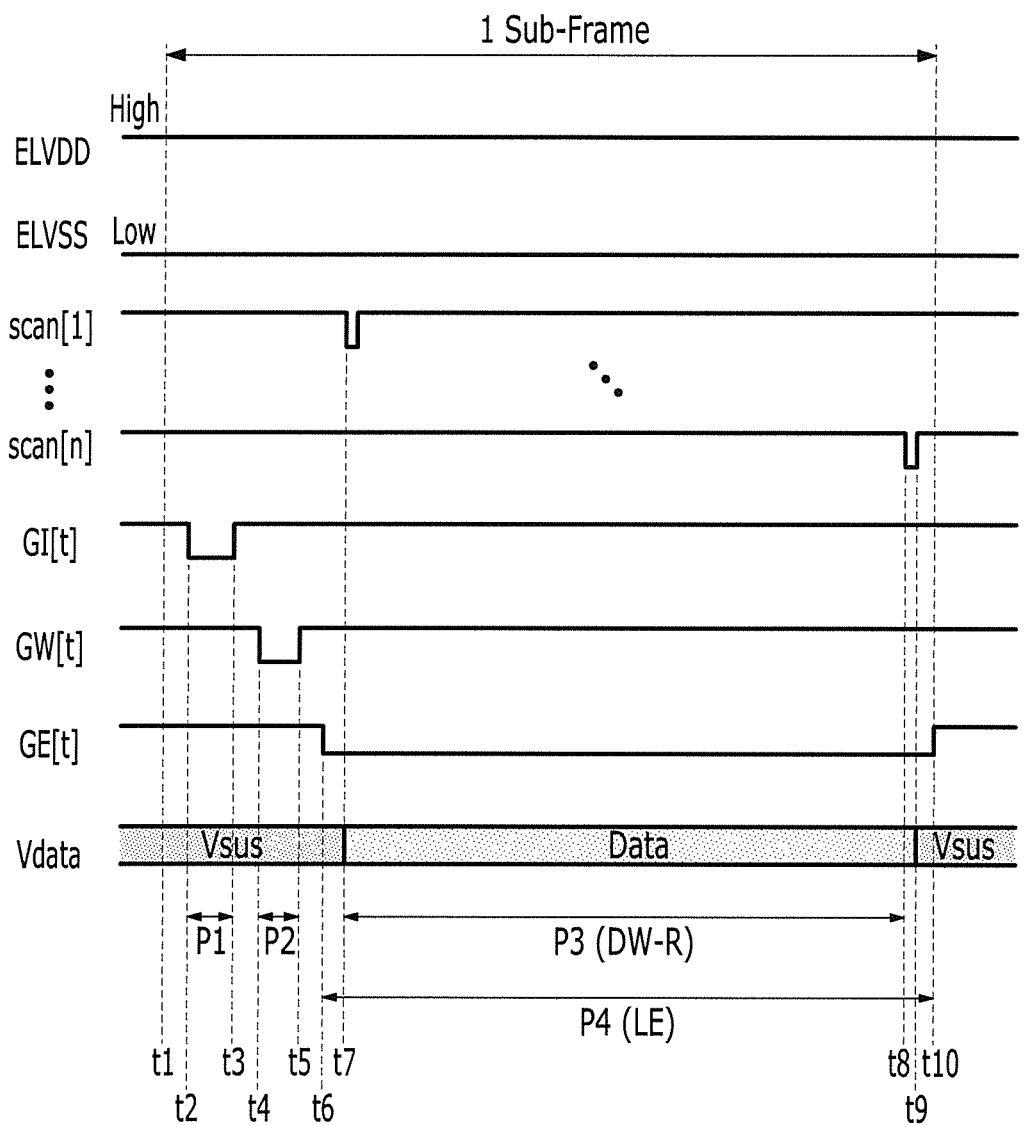
FIG. 5 is an exemplary embodiment of a driving timing diagram of pixel operation shown in FIG. 4.
Figure 6:
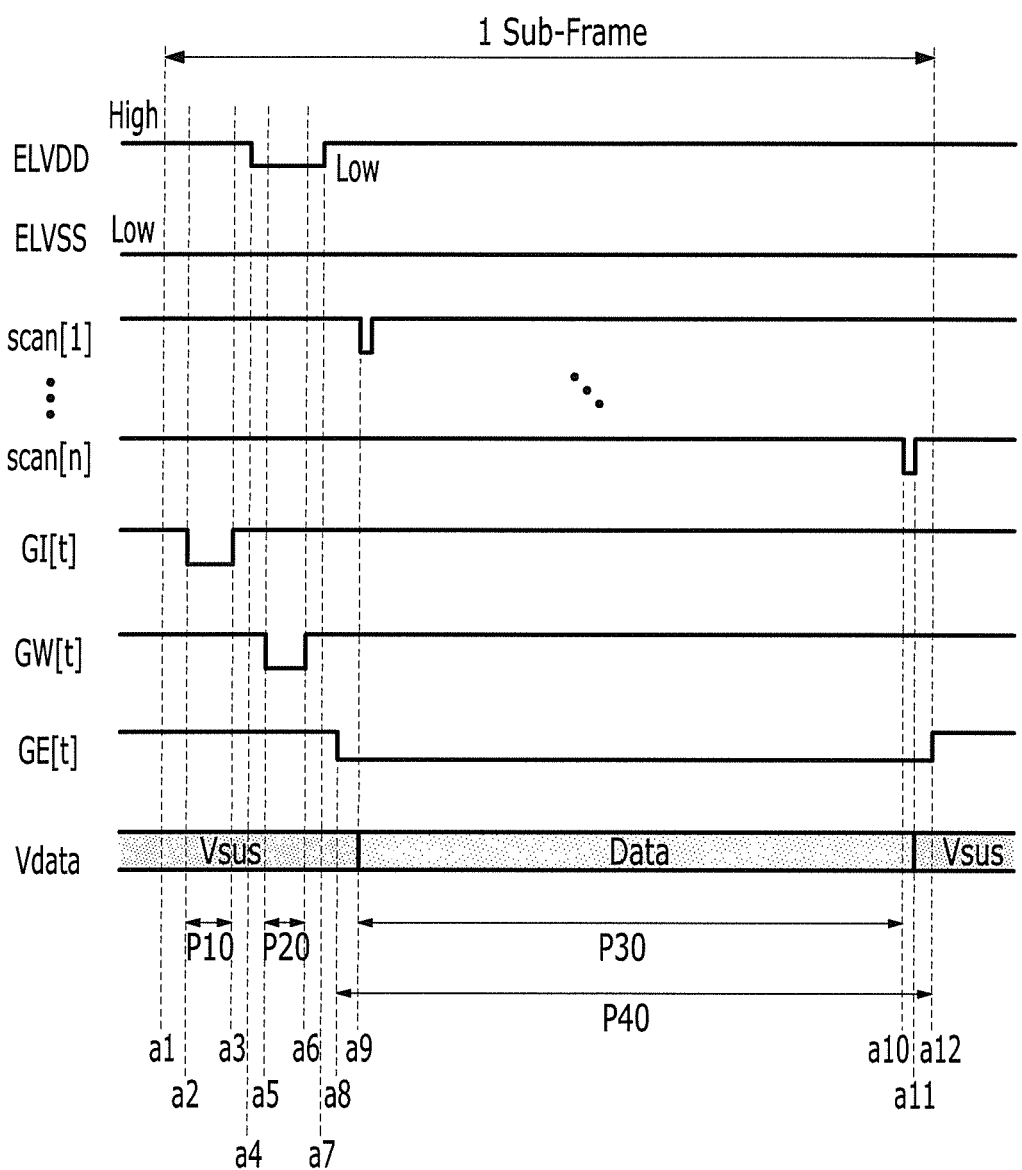
FIG. 6 is a driving timing diagram of another exemplary embodiment of the pixel operation of FIG. 4.

FIG. 5 and FIG. 6 are exemplary embodiments for description of the driving method of the stereoscopic image display device of the present invention, and they are similar to each other, excluding a voltage level of the driving power voltage transmitted for driving of the pixel. FIG. 5 and FIG. 6 correspond to a driving method during one sub-frame of a frame, in particular, they correspond to the driving method of a left eye sub-frame (or left eye period LE). The driving methods of the one sub-frame illustrated in FIGS. 5 and 6 may be applied to other sub-frames, for example, the right eye sub-frame (or right eye period RE), by changing the image data signals to correspond to that sub-frame.

First, the driving of the stereoscopic image display device according to the present invention will be described with reference to FIG. 5.

Referring to FIG. 5, the stereoscopic image display device is driven through an initialization and on-bias period P1, a compensation and data transmission period P2, a data writing period P3, and a light emission period P4.

The initialization and bias-on period P1, the compensation and data transmission period P2, and the light emission period P4 may be concurrently (or simultaneously) performed in the all of the pixels 70 of the display panel 10. In addition, the data writing period P3 may be sequentially performed along the pixel lines in the display panel 10.

In an embodiment of the present invention, the data writing period P3 and the light emission period P4 are concurrently (or simultaneously) performed (e.g., performed without a time difference) in each pixel of the display panel 10. For example, the data writing period P3 and the light emission period P4 are concurrently (or simultaneously) performed in each pixel.

In this case, an image displayed during the light emission period P4 depends on the image data signal written in the previous frame.

The driving timing diagram of FIG. 5 is based on one sub-frame including a time t1 to a time t10.

For example, the initialization and bias-on period P1 may be started at the time t2 and terminated at the time t3. At the time t2, the initialization control signal GI[t] may be transmitted as a gate-on voltage through the initialization control line GI commonly coupled to the respective gate electrodes of the third and fourth transistors M3 and M4 of all of the pixels 70 of the display panel 10. In this case, if the third and fourth transistors are PMOS transistors, the gate-on voltage is the logic low level voltage.

The third and fourth transistors M3 and M4 of all of the pixels are concurrently (or simultaneously) turned on according to the initialization control signal GI[t] shifted to the logic low level voltage. The third transistor M3 and the fourth transistor M4 may maintain the turn-on state until the initialization control signal GI[t] increases to the logic high level voltage at the time t3.

Because the emission control signals GE[t], which are transmitted to the respective gate electrodes of the seventh transistor M7 and the eighth transistor M8, maintain a high level (e.g., the gate-off voltage level) during the initialization and bias-on period P1, the seventh transistor M7 and the eighth transistor M8 are turned off, and accordingly, light emission of the organic light emitting diodes OWED of all of the pixels 70 of the display panel 10 is stopped. That is, light emission according to an image data signal corresponding to one time among the stereoscopic image data signals for realization of the stereoscopic image during the period P1 is terminated (e.g., terminated for all pixels).

The third transistor M3 turned on during the initialization and bias-on period P1 receives the reference voltage Vsus from the data line to which a corresponding pixel is coupled and transmits the reference voltage Vsus to the second node N2. In addition, the turned-on fourth transistor M4 transmits the initialization voltage Vint applied from the supply source of the initialization voltage Vint to the third node N3.

Since the second node N2 and the third node N3 are, respectively coupled to electrodes of the storage capacitor Cst, a voltage corresponding to the difference between the reference voltage Vsus and the initialization voltage Vin, respectively applied to the second node N2 and the third node N3, is stored in the storage capacitor Cst. Thus, the data voltage previously stored according to image data signal in the storage capacitor Cst is initialized during the period P1.

In addition, the initialization voltage Vint is applied to the third node N3, to which the gate electrode of the driving transistor M1 is coupled, during the period P1. Because the initialization voltage Vint is lower than the logic low level voltage, the on-bias voltage is applied to the gate electrode of the driving transistor M1 at the same time the initialization process is performed during the period P1. When the on-bias voltage is applied, the driving transistor M1 is turned on, but a path for the driving current is not formed to the organic light emitting diode OLED from the driving transistor M1 due to the eighth transistor M8 being in the turn-off state, and thus, the organic light emitting diode does not emit light during the initialization and bias-on period P1. During the period P1, occurrence of hysteresis of the respective driving transistors due to iterative data writing to the pixel may be prevented by applying the on-bias voltage to the driving transistor M1.

The compensation and data transmission period P2 is started at the time t4. The compensation and data transmission period P2 is terminated at the time t5.

During the compensation and data transmission period P2, the compensation control signal GE[t] may be changed to the gate-on voltage and transmitted to the respective gate electrode of the fifth transistor M5 and the sixth transistor M6 through the compensation control line GW commonly coupled to the respective gate electrodes. At the time t4, the fifth transistor M5 and the sixth transistor M6 of all of the pixels may be concurrently (or simultaneously) turned on according to the compensation control signal GE[t] pulled to the logic low level voltage. The fifth transistor M5 and the sixth transistor M6 may maintain the turn-on state until the compensation control signal GW[t] increases to the logic high level voltage at the time t6.

During the compensation and data transmission period P2, the third and fourth transistors M3 and M4 (which are in the turn-on state during the initialization and bias-on period P1) are in the turn-off state.

The fifth transistor M5 (which may be turned on during the compensation and data transmission period P2) transmits the voltage applied to the first node N1 to the second node N2.

The voltage applied to the first node N1 is an image data voltage according to an image data signal written and stored in the storage capacitor Chold during a data writing period of the previous frame. Thus, the fifth transistor M5 functions to transmit the data voltage charged in the sustain capacitor Chold to the second node N2, to which the first electrode of the storage capacitor Cst is coupled, during the compensation and data transmission period P2.

In addition, the turn-on sixth transistor M6 diode-connects the gate electrode and the drain electrode of the driving transistor M1 during the compensation and data transmission period P2. Thus, the threshold voltage Vth of the driving transistor M1 is applied to the third node N3, to which the gate electrode of the driving transistor M1 is coupled, through the sixth transistor M6. Threshold voltages of the driving transistors of all of the pixels may be different from each other, and the threshold voltage transmitted to the gate electrode of each driving transistor M1 during the period P2 is compensated, with consideration of the data voltage according to the image data signal stored in the storage capacitor Cst, and therefore, an image according to a data signal, which may be emitted during the next light emission period, will not be influenced.

The voltage stored in the storage capacitor Cst during the compensation and data transmission period P2 corresponds to a difference between the voltages respectively applied to the second node N2 and the third node N3.

The voltage applied to the third node N3 may be ELVDD−Vth, and the voltage applied to the second node N2 becomes a valid data voltage Veff. Here, the valid data voltage may be a voltage applied to the second node N2, that is, an effective voltage value of a data voltage according to an image data signal stored in the sustain capacitor Chold in the previous frame in the driving process according to the exemplary embodiment of the present invention. As in the exemplary embodiment of the present invention, a voltage according to a written data signal may not be directly reflected, and thus, a voltage may finally be determined through distribution of the charge amount by the capacitance of the capacitors that are included in the pixel circuit (including the storage capacitor). The effective data voltage may be a data voltage according to an image data signal that is substantially stored according to the distribution of the charge amount.

The effective data voltage Veff may be described by the following equation.

$$\text{effective data voltage } (Veff) = \frac{Chold \times Vdata + \frac{Cst \times Cox}{Cst + Cox} \times Vsus}{Chold + \frac{Cst \times Cox}{Cst + Cox}} + \frac{Cst}{Chold + Cst} \times \Delta V \quad \text{[equation 1]}$$

Here, $$\Delta V = ELVDD - Vth - Vint - \frac{Cst}{Cst + Cox} \times \frac{Chold}{Chold + \frac{Cst \times Cox}{Cst + Cox}} \times (Vdata - Vsus)$$

In equation 1, Chold denotes the capacitance of the sustain capacitor Chold, Cst denotes the capacitance of the storage capacitor Cst, and Cox denotes the capacitance of a parasitic capacitor formed between the channel and the gate of the driving transistor M1.

In order to calculate the valid data voltage Veff, ΔV is used. ΔV may be defined as a voltage value according to a difference between a voltage (ELVDD−Vth) applied to the third node N3 and a voltage changed due to coupling when the voltage of the third node N3 is changed due to the coupling of the storage capacitor Cst while the data stored in the sustain capacitor Chold is transmitted to the second node N2 during the compensation and data transmission period P2.

In addition, Vsus denotes a reference voltage applied through the date line, Vint denotes an initialization voltage, and Vdata denotes a data voltage applied through a data line according to the corresponding image data signal in the corresponding frame.

Since the data voltage Vdata can be transmitted with various voltage levels according to a gray scale that a stereoscopic image displays, the data voltage Vdata can be expressed to correspond to a Data period in the data writing period P3 as shown in FIG. 5. The data voltage Vdata in Equation 1 is a voltage according to an image data signal written with various gray levels, for example the Data period, in a data period of the previous frame.

The data writing period P3 and the light emission period P4 may be concurrently (or simultaneously) performed after the threshold voltage compensation and the data transmission period P2 may be passed according to the driving process of the exemplary embodiment of the present invention.

During the data writing period P3 or the light emission period P4, the fifth transistor M5 and the sixth transistor M6 (which may be in the turn-on state during the compensation and data transmission period P2) are turned off.

For example, the light emission period P4 starts at the time t6 and the data writing period P3 starts at the time t7, and thus, the data voltage Vdata is written with various voltage levels and stored as shown the period DATA.

The light emission period P4 may be terminated at the time t10 and the data writing period P3 may be terminated at the time t9.

The start of the data writing period P3 may be performed while the scan signals are transmitted as the gate-on voltage through the sequentially corresponding scan lines along a pixel line among the pixels 70 of the display panel 10 at the time t7. That is, the first scan signal scan[1] corresponding to the first scan line S1 coupled to the plurality of pixels 70 included in the first pixel line is transmitted as the logic low level at the time t7.

Thus, the plurality of scan signals scan[1] to scan[n] are sequentially transmitted along the pixel line, and the n-th scan signal scan[n] is transmitted to the plurality of pixels 70 included in the n-th pixel line at the time t8.

When the scan signals (sequentially shifted to the gate-on voltage level) are transmitted to the plurality of pixels 70, respectively along the pixel lines, the switching transistor M2 of the pixel 70 of FIG. 4 is turned on. The data voltage Vdata, according to the corresponding image data signal, may be applied through the data line coupled to the source electrode of the switching transistor M2, and the data voltage may be applied to the first node N1 through the switching transistor M2. Because the first electrode of the sustain capacitor Chold is coupled to the first node N1 and the second electrode thereof is coupled to the supply source of the initialization voltage Vint, a voltage corresponding to the difference between the data voltage Vdata applied to the first node N1 and the initialization voltage Vin is sequentially stored in the sustain capacitor Chold.

Referring to the driving process of the stereoscopic image display device shown in the FIG. 2, the two sub-frames of the left eye image period LE and the right eye image period RE of FIG. 2 may correspond to 1 frame, of which one sub-frame is illustrated in the timing diagram of FIG. 5. Thus, for convenience of description, the one sub-frame illustrated in FIG. 6 corresponds to the left eye image period LE, where light is emitted according to a data voltage according to the left eye image data signal and the data voltage written to the sustain capacitor Chold during the data writing period P3 is a data voltage according to the right eye image data signal. Accordingly, the data writing period P3 of FIG. 5 may, for example, correspond to the right eye data writing period DW-R of FIG. 2.

With the data voltage according to the image data signal, sequentially stored in the sustain capacitor Chold during the data writing period P3, the organic light emitting diode OLED emits light with a driving current corresponding to a light emission period of the next sub-frame.

The data voltage is sequentially written to the sustain capacitor Chold during the data writing period P3 and at the same time the emission control signal GE[t] is additionally transmitted to all of the pixels included in the display panel 10 during the light emission period P4 of the time t6 to the time t10. That is, the emission control signal GE[t] is transmitted as the gate-on voltage level through the emission control line GE commonly coupled to the respective gate lines of the seventh and eighth transistors M7 and M8.

The seventh transistor M7 and the eighth transistor M8 of the pixels 70 are concurrently (or simultaneously) turned on corresponding to the emission control signal GE[t] shifted to the logic low level voltage at the time t6. The seventh transistor M7 and the eighth transistor M8 maintain the turn-on state until the emission control signal GE[t] rises to the high level voltage at the time t10.

The first power voltage ELVDD of a high potential may be transmitted to the second node N2 through the seventh transistor M7 during the light emission period P4. In addition, a voltage Vg may be applied to the third node N3, to which the gate electrode of the driving transistor M1 coupled, the voltage Vg is given as the following equation.

$$Vg = ELVDD - Vth - \frac{Cst}{Cst + Cox} \times (ELVDD - Veff) \qquad \text{[Equation 2]}$$
$$= \frac{Cst \times Veff + Cox \times ELVDD}{Cst + Cox} - Vth$$

In Equation 2, Veff denotes an effective data voltage calculated in Equation 1, and therefore, a voltage according to an image data signal emitting during the light emission period P4 is a voltage according to an image data signal sequentially written to the sustain capacitor Chold during a data writing period of the previous frame. Thus, according to the driving method of the exemplary embodiment of FIG. 2, an image display realized during the light emission period P4 corresponds to the data voltage written in the previous sub-frame (e.g., the left eye image data signal written in the previous sub-frame) even though the data writing period P3 is concurrently (or simultaneously) performed. The data voltage according to the left eye image data signal written in the previous sub-frame may be the left eye image data voltage transmitted to the storage capacitor Cst through the initialization and bias-on period P1 and the compensation and data transmission period P2.

According to the driving process of FIG. 2, the light emission period P4 may correspond to the left eye image period LE.

A driving current Ioled for driving the organic light emitting diode OLED for displaying an image with light emitted from the organic light emitting diode OLED during the light emission period P4 is given as the following equation.

$$Ioled = \frac{1}{2}\mu Cox\frac{W}{L}(Vgs - Vth)^2 = \frac{1}{2}\mu Cox\frac{W}{L}\left(\frac{Cst(ELVDD - Veff)}{Cst + Cox}\right)^2 \quad \text{[equation 3]}$$

Here, μ denotes a constant, W denotes a width of the organic light emitting diode, and L a length of the organic light emitting diode.

The light emitting diode emits light during the light emission period P4 according to the driving current of Equation 3 such that, for example, a left eye image is displayed.

In the next frame, a right eye image may be displayed according to the right eye image data signal written according to the driving timing and driving process of FIG. 5, and at the same time, the left eye image data signal is sequentially written to the sustain capacitor Chold.

FIG. 6 is a driving timing diagram of another exemplary embodiment of the pixel of FIG. 4.

The timing diagram of FIG. 6 is similar to that of FIG. 5, and the driving process of FIG. 6 is also similar to that of FIG. 5. The driving process of FIG. 6 includes an initialization and bias-on period P10, a compensation and data transmission period P20, a data writing period P30, and a light emission period P40.

Accordingly, only differences in driving as compared with the driving of FIG. 5 will be described in detail below. Referring to FIG. 6, during a period before start and after termination of the compensation and data transmission period P20, a voltage level of the first power voltage ELVDD is set to a low level.

That is, at a time a4, which is before a time a5 at which the compensation and data transmission period P20 starts, the first power voltage ELVDD may be supplied as a low level voltage. In addition, the first power voltage ELVDD may maintain the low level and then may be changed to the high level at a time a7 after the termination time (i.e., time a6) of the compensation and data transmission period P20.

During the period P20, the fifth transistor M5 and the sixth transistor M6 may be turned on by the compensation control signal GW[t], and a data level may be controlled by adjusting the voltage level of the first power voltage ELVDD to low level.

Because the first power voltage ELVDD (which is applied to the second node N2 through the seventh transistor M7 that is turned on by the emission control signal GE[t]) functions as a reference potential in driving current generation according to the data voltage during the light emission period P40, the data voltage Vdata according to the data voltage can provide a suitable (or predetermined) luminance when the data voltage Vdata is higher than the first power voltage ELVDD. That is, because the organic light emitting diode OLED emits light with a voltage of the third node N3 decreased to the (ELVDD−Vdata) voltage, the data voltage Vdata should be higher than the first power voltage ELVDD.

In the exemplary embodiment of FIG. 6, the first power voltage ELVDD is changed to low level during the compensation and data transmission period P20, and therefore the data voltage Vdata related to the amount of current for light emission of the organic light emitting diode can be simply controlled to be higher than the reference potential of the first power voltage ELVDD.

The foregoing referenced drawings and detailed description of the present invention are all exemplary and used for explaining the present invention, and do not limit the meaning or the scope of the present invention defined in the claims. Therefore, those skilled in the art can easily select and substitute the drawings and disclosed description. Those skilled in the art can omit some of the constituent elements described in the present specification without deterioration in performance thereof or can add elements to alter the performance thereof. Furthermore, those skilled in the art can modify the sequence of the steps of the method described in the present specification depending on the process environment or equipment. Therefore, the scope of the present invention must be determined by the scope of the claims and their equivalents, not by the described embodiments.

What is claimed is:

1. A stereoscopic image display device comprising:
a display panel comprising a plurality of pixels configured to emit light according to stored data voltages during corresponding sub-frames of a corresponding frame;
a scan driver for transmitting scan signals to the pixels;
a gate driver for transmitting an initialization control signal, a compensation control signal, and an emission control signal to the pixels;
a data driver for transmitting first image data signals and second image data signals, which correspond to a different view point from that of the first image data signals, to the pixels; and
a controller for controlling operation of the scan driver, the gate driver, and the data driver, and for generating and transmitting the first image data signals and the second image data signals according to an external image signal,
wherein the corresponding sub-frames comprise a first sub-frame that comprises:
a first period for initializing the stored data voltages of the pixels that correspond to third image data signals transmitted in a previous sub-frame of a previous frame to an initialization voltage;
a second period for changing the stored data voltages of the pixels to correspond to the first image data signals written in the previous sub-frame for light emission in the first sub-frame and for compensating a threshold voltage of a driving transistor of each pixel;
a third period for sequentially writing second data voltages, which correspond to the second image data signals of a second sub-frame of the corresponding frame, to the pixels; and
a fourth period, configured to be concurrent with and as long as or longer than the third period, for emitting light from the pixels according to the stored data voltages that correspond to the first image data signals,
wherein each of the plurality of pixels is configured to concurrently emit light according to a corresponding one of the stored data voltages and to store a corresponding one of the second image data signals.

2. The stereoscopic image display device of claim 1, wherein a view point of the second image data signals and the third image data signals correspond to the same view point, and the view point of the second and third image data signals is different from a view point of the first image data signals.

3. The stereoscopic image display device of claim 1, wherein the first image data signals are left eye image data signals, and the second and third image data signals are right eye image data signals.

4. The stereoscopic image display device of claim 1, wherein each of the pixels is coupled to a scan line for transmitting a corresponding one of the scan signals, an initialization control line for transmitting the initialization control signal, a compensation control line for transmitting the compensation control signal, an emission control line for transmitting the emission control signal, and a data line for transmitting a corresponding one of the first, second, and third image data signals.

5. The stereoscopic image display device of claim 1, wherein the gate driver comprises an initialization driver for generating and transmitting the initialization control signal, a compensation driver for generating and transmitting the compensation control signal, and a light emission driver for generating and transmitting the emission control signal.

6. The stereoscopic image display device of claim 1, further comprising a power supply for supplying a first power voltage and a second power voltage for driving the pixels and an initialization voltage for initializing each of the pixels.

7. The stereoscopic image display device of claim 1, wherein the pixels of the display panel are configured to be concurrently operated during the first, second, and fourth periods, and the pixels of the display panel are configured to be sequentially operated in each pixel line during the third period.

8. The stereoscopic image display device of claim 1, wherein, during the first period, a gate electrode terminal of a driving transistor of each pixel is configured to be applied with an initialization voltage in response to the initialization control signal transmitted to respective ones of pixels to apply an on-bias voltage to the driving transistor.

9. The stereoscopic image display device of claim 8, wherein the initialization voltage is equivalent to a gate-on voltage of the driving transistor, and current paths passing through the driving transistors to organic light emitting diodes are configured to not be formed during the first period.

10. The stereoscopic image display device of claim 1, wherein, during the second period, written data voltages, which correspond to the first image data signals written to corresponding sustain capacitors of the pixels during the previous sub-frame, are configured to be transmitted to corresponding storage capacitors of the pixels in response to the compensation control signal transmitted to the pixels, and a gate electrode and a drain electrode of the driving transistor of each pixel are configured to be diode-connected in response to the compensation control signal.

11. The stereoscopic image display device of claim 1, wherein, during the third period, the second data voltages, which correspond to the second image data signals, are configured to be stored in corresponding sustain capacitors of the pixels in response to scan signals sequentially transmitted to the pixels along scan lines.

12. The stereoscopic image display device of claim 1, wherein, during the fourth period, organic light emitting diodes of the pixels emit light according to corresponding driving currents that correspond to the stored data voltages, which correspond to the first image data signals, in response to the emission control signal transmitted to the pixels.

13. The stereoscopic image display device of claim 1, wherein the second sub-frame of the corresponding frame comprises:
    a fifth period for initializing the stored data voltages of the pixels that correspond to first image data signals transmitted in the first sub-frame of the corresponding frame to the initialization voltage;
    a sixth period for changing the stored data voltages of the pixels to correspond to the second image data signals written in the first sub-frame for light emission in the second sub-frame and for compensating the threshold voltage of the driving transistor of each pixel;
    a seventh period for sequentially writing to the pixels fourth data voltages that correspond to fourth image data signals of a next sub-frame of a next frame; and
    an eighth period, configured to be concurrent with and as long as or longer than the seventh period, for emitting light from the pixels according to the stored data voltages that correspond to the second image data signals.

14. A method for driving a stereoscopic image display device comprising a plurality of pixels coupled to corresponding scan lines, initialization control lines, compensation control lines, emission control lines, and data lines and for emitting light according to stored data voltages during corresponding sub-frames of a corresponding frame, the method comprising:
    initializing the stored data voltages, which correspond to a previous sub-frame of a previous frame, in the pixels to initialization voltages in response to an initialization control signal transmitted through the initialization control lines;
    changing the stored data voltages in a storage capacitor of each pixel to correspond to first image data signals, the first image data signals being written in a previous sub-frame for light emission in the corresponding sub-frame of the corresponding sub-frames, and compensating for a threshold voltage of a driving transistor of each pixel in response to a compensation control signal transmitted through the compensation control lines;
    writing second data voltages corresponding to second image data signals, of which a view point is different from that of the first image data signals, to sustain capacitors of the pixels in response to scan signals sequentially applied along a plurality of pixel lines; and
    emitting light with a driving current corresponding to the stored data voltage corresponding to the first image data signals from the pixels in response to an emission control signal transmitted through the emission control lines,
    wherein each of the pixels is configured to concurrently emit light according to a corresponding one of the stored data voltage and to store a corresponding one of the second image data signals.

15. The method for driving the stereoscopic image display device of claim 14, wherein the light emission is performed separately from the writing of the second data voltage according to the second image data signals to the sustain capacitor in each pixel.

16. The method for driving the stereoscopic image display device of claim 15, wherein the light emission is performed in the same period as the writing of the second data voltage corresponding to the second image data signals, or performed during a period that is concurrent with and longer than the writing of the second data voltage corresponding to the second data signals.

17. The method for driving the stereoscopic image display device of claim 14, wherein the first image data signals are left eye image data signals, and the second image data signals and third image data signals are right eye image data signals.

18. The method for driving the stereoscopic image display device of claim 14, wherein a driving voltage of a high potential that drives the pixels is transmitted as a low voltage level while the stored data voltage according to the first image data signals are transmitted to the storage capacitor of each of the pixels and the threshold voltages of the driving transistors the pixels are compensated.

* * * * *